United States Patent
Haberman et al.

(10) Patent No.: US 9,838,738 B2
(45) Date of Patent: Dec. 5, 2017

(54) SYSTEMS, METHODS AND COMPUTER-READABLE MEDIA FOR LOCAL CONTENT STORAGE WITHIN A MEDIA NETWORK

(71) Applicant: Visible World, Inc., New York, NY (US)

(72) Inventors: Seth Haberman, New York, NY (US); Gerrit Niemeijer, Maplewood, NJ (US)

(73) Assignee: Visible World, Inc., New York, NY (US)

(*) Notice: Subject to any disclaimer, the term of this patent is extended or adjusted under 35 U.S.C. 154(b) by 0 days.

(21) Appl. No.: 13/960,382

(22) Filed: Aug. 6, 2013

(65) Prior Publication Data

US 2014/0040947 A1    Feb. 6, 2014

Related U.S. Application Data

(60) Provisional application No. 61/679,836, filed on Aug. 6, 2012.

(51) Int. Cl.
*H04N 21/234* (2011.01)
*H04N 21/235* (2011.01)
(Continued)

(52) U.S. Cl.
CPC ... *H04N 21/44016* (2013.01); *H04N 21/2402* (2013.01); *H04N 21/2668* (2013.01);
(Continued)

(58) Field of Classification Search
CPC ......... H04N 21/23424; H04N 21/2353; H04N 21/23611; H04N 21/23614;
(Continued)

(56) References Cited

U.S. PATENT DOCUMENTS 5,027,400 A    6/1991    Baji et al.
6,002,393 A   12/1999    Hite et al.
(Continued)

FOREIGN PATENT DOCUMENTS

JP    H02-054646 A    2/1990
JP    2004-531955    10/2004
(Continued)

OTHER PUBLICATIONS

International Search Report and the Written Opinion of the International Searching Authority, dated Dec. 19, 2013, from foreign application PCT/US2013/053822, International Filing Date Aug. 6, 2013.

(Continued)

*Primary Examiner* — Dominic D Saltarelli
(74) *Attorney, Agent, or Firm* — Baker & Hostetler LLP

(57) ABSTRACT

Systems, methods and computer-readable storage media for storing or caching targeted content on a receiver device using existing bandwidth within a media network are described. For example, unused bandwidth within a transport stream may be detected and targeted content may be inserted into the transport stream within the unused bandwidth. The targeted content may include targeted advertisements for a household addressable media network. The transport stream may be transmitted to the receiver device which may access and store the targeted content responsive to various targeted content signals. For instance, the transport stream may include targeted content signals configured to trigger the receive device to access and store the targeted content. The transport stream may include a commercial feed transport stream.

26 Claims, 4 Drawing Sheets

(51) Int. Cl.
*H04N 21/236* (2011.01)
*H04N 21/238* (2011.01)
*H04N 21/433* (2011.01)
*H04N 21/654* (2011.01)
*H04N 21/44* (2011.01)
*H04N 21/458* (2011.01)
*H04N 21/81* (2011.01)
*H04N 21/24* (2011.01)
*H04N 21/262* (2011.01)
*H04N 21/6543* (2011.01)
*H04N 21/2668* (2011.01)

(52) U.S. Cl.
CPC ... *H04N 21/26216* (2013.01); *H04N 21/4331* (2013.01); *H04N 21/458* (2013.01); *H04N 21/6543* (2013.01); *H04N 21/812* (2013.01)

(58) Field of Classification Search
CPC ........... H04N 21/2385; H04N 40/4331; H04N 60/6543; H04N 60/6547; H04N 21/4331; H04N 21/6543; H04N 21/6547
USPC ..................................................... 725/32–36
See application file for complete search history.

(56) References Cited

U.S. PATENT DOCUMENTS

| | | | |
|---|---|---|---|
| 6,029,045 A | 2/2000 | Picco et al. | |
| 6,698,020 B1* | 2/2004 | Zigmond et al. | 725/34 |
| 6,771,657 B1 | 8/2004 | Elstermann | |
| 7,788,687 B1 | 8/2010 | Conrad et al. | |
| 2002/0077909 A1* | 6/2002 | Kanojia | G06Q 30/0264 705/14.61 |
| 2002/0194589 A1 | 12/2002 | Cristofalo et al. | |
| 2003/0135553 A1 | 7/2003 | Pendakur | |
| 2003/0194199 A1 | 10/2003 | Roth | |
| 2007/0211141 A1 | 9/2007 | Christiansen | |
| 2008/0307453 A1 | 12/2008 | Haberman | |

FOREIGN PATENT DOCUMENTS

| | | |
|---|---|---|
| JP | 2005-515571 | 5/2005 |
| JP | 2007-005986 A | 1/2007 |
| JP | 2007-151142 A | 6/2007 |
| JP | 2010-530665 A | 9/2010 |
| JP | 2011-078062 A | 4/2011 |
| WO | 03053046 A1 | 6/2003 |

OTHER PUBLICATIONS

Extended European Search Report and European Search Opinion, dated Feb. 19, 2016, from corresponding European Patent Application No. 13827348.7.

* cited by examiner

SYSTEMS, METHODS AND COMPUTER-READABLE MEDIA FOR LOCAL CONTENT STORAGE WITHIN A MEDIA NETWORK

CROSS REFERENCE TO RELATED APPLICATIONS

This application claims the benefit of U.S. Provisional Application No. 61/679,836 filed on Aug. 6, 2012, the contents of which are incorporated by reference in their entirety as if fully set forth herein.

FIELD OF INVENTION

The described technology generally relates to storing content at a local receiver device within a media network, and, more specifically, to the efficient use and/or configuration of available bandwidth within the media network for caching content at a local receiver device for subsequent playback by the device.

BACKGROUND

Household addressable media networks, such as cable and satellite television networks, allow network operators to provide specific content to target households. For example, an advertiser may be able to send one version of an advertisement to a first segment of households and another version of the advertisement to a second segment of households. Receiver devices, such as set-top-boxes (STB), may be configured to cache targeted content so that the targeted content may be accessed locally when a programming slot, such as an advertising slot, requires the targeted content. However, accessing and caching the targeted content is performed outside of normal content access for the receiver device, such as normal television viewing by a user. Existing technology provides for additional broadcast streams for transmitting the targeted content to the receiver devices for local storage. However, this introduces inefficiencies and extra cost into the operation of the media network due to the need to handle extra bandwidth. Accordingly, a media network may benefit from a system in which targeted content may be provided to receiver devices for local caching without also requiring additional resources that diminish the value of targeted content within a household addressable network.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a system for storing at least one targeted content element on a receiver device within a household-addressable media network may include a processor and a non-transitory, computer-readable storage medium in operable communication with the processor. The computer-readable storage medium may contain one or more programming instructions that, when executed, cause the processor to determine unused bandwidth in at least one transport stream being broadcast to the receiver device, insert the at least one targeted content element into the unused bandwidth, and provide a content storage signal to the receiver device to store the targeted content element.

In an embodiment, a computer-implemented method for storing at least one targeted content element on a receiver device within a household-addressable media network may include, by a processor determining unused bandwidth in at least one transport stream being broadcast to the receiver device by the media network, inserting the at least one targeted content element into the unused bandwidth, and providing a content storage signal to the receiver device to store the targeted content element.

In an embodiment, a receiver device for storing at least one targeted content element broadcast through at least one transport stream within a household-addressable media network may include a plurality of tuners configured to tune the receiver device to receive the at least one transport stream, a processor, at least one storage device in operable communication with the processor, and a non-transitory, computer-readable storage medium in operable communication with the processor. The computer-readable storage medium contains one or more programming instructions that, when executed, cause the processor to receive a content storage signal comprising targeted content information, tune at least one of the plurality of tuners to the at least one transport stream responsive to receiving the content storage signal, and store the at least one pre-stored content element in the at least one storage device based on the pre-stored content information.

In an embodiment, a computer-readable storage medium having computer-readable program code configured to store at least one targeted content element on a receiver device within a household-addressable media network. The computer-readable program code may include computer-readable program code configured to determine unused bandwidth in at least one transport stream being broadcast to the receiver device, computer-readable program code configured to insert the at least one targeted content element into the unused bandwidth, and computer-readable program code configured to provide a content storage signal to the receiver device to store the targeted content element.

BRIEF DESCRIPTION OF THE DRAWINGS

The above and other objects of the present invention will become more readily apparent from the following detailed description taken in connection with the accompanying drawings.

DETAILED DESCRIPTION

The described technology is generally directed to systems, methods and computer-readable media configured to store targeted content broadcast within a media network on a receiver device for subsequent playback on the receiver device. For example, some embodiments may provide for analyzing a transport stream, such as a commercial feed transport stream, for unused bandwidth. The targeted content may be inserted into the unused bandwidth and transmitted to the receiver device. One or more targeted content signals may also be provided to the receiver device to trigger the receiver device to access and store the targeted content.

Figure 1:
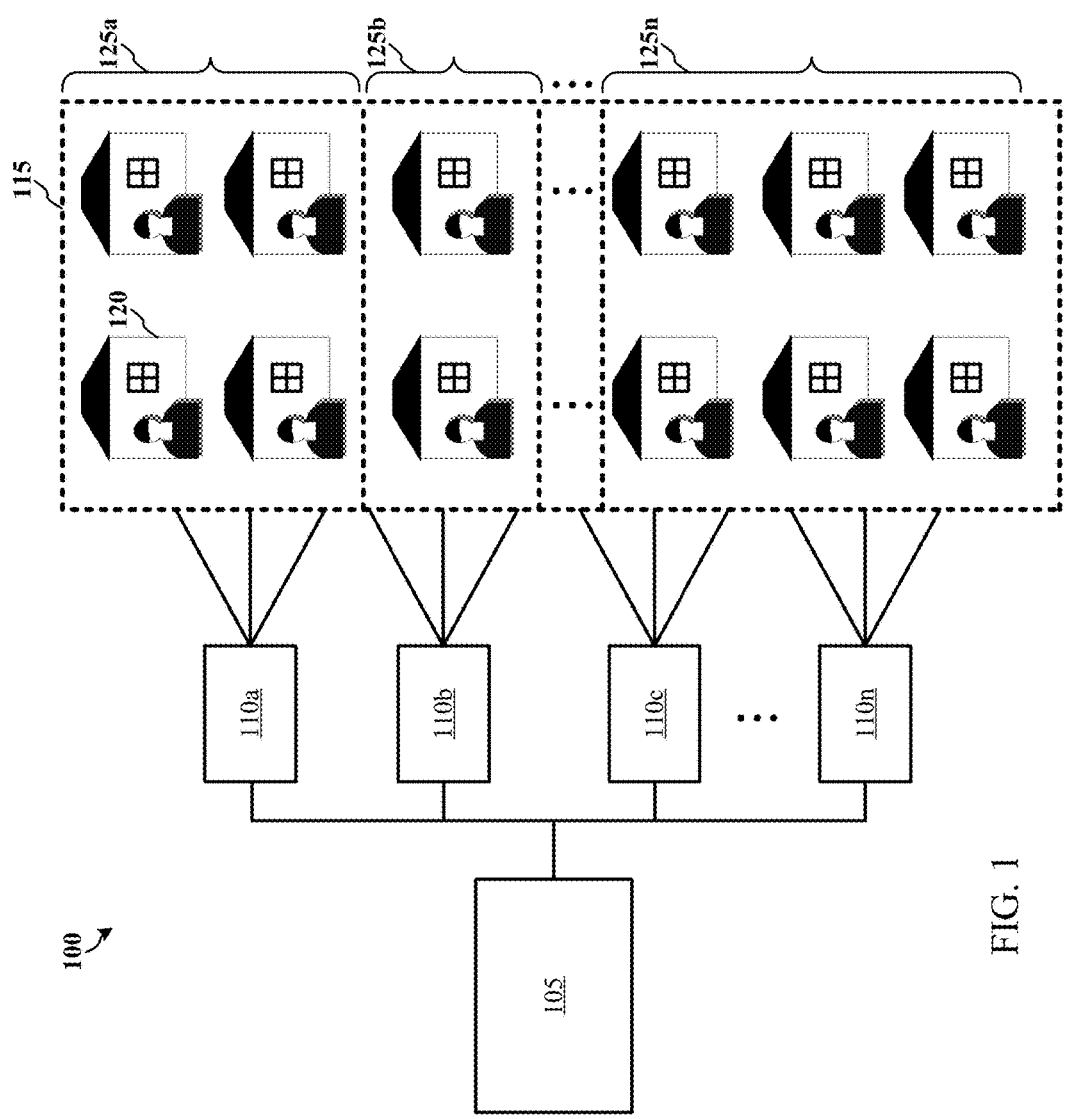
FIG. 1 depicts an illustrative media network according to some embodiments.

FIG. 1 depicts an illustrative media network according to some embodiments. As shown in FIG. 1, a media network 100 may include a media content provider 105. Non-limiting examples of a media content provider 105 include a television broadcast network, a cable television network, a satellite television network, an internet service provider (ISP), a computing device advertising network, a media distribution network, a cloud computing network, a local area network (LAN), a wide area network (WAN), or any combination thereof. The media content provider 105 may transmit content to one or more local content systems 110a-110n configured to communicate with an audience 115 of the media network 100. The local content systems 110a-110n may include equipment and systems configured to transmit media content received from the media content provider 105 to a defined portion of the audience 115. Illustrative and non-restrictive examples of a local content system 110a-110n include a cable television network headend, an internet service provider base station, or the like.

According to embodiments, the media content provider 105 may be configured to operate across physical device platforms and networks simultaneously. For example, content may be delivered to set-top-boxes (STBs) and/or digital video recorders (DVRs) over a cable television system, to mobile computing devices using standard network communication protocols (for instance, Ethernet or Wi-Fi) over an ISP network, to smart phone devices over standard telecommunication protocols (for instance, third Generation (3G), fourth Generation (4G), long-term evolution (LTE), or the like), and to home gateway devices through a LAN, WAN and/or ISP network.

The audience 115 may include a plurality of households 120 capable of receiving media content from the media network 100 through various receiver devices, including, without limitation, a STB, a television, a DVR, a personal computer (PC), a laptop computer, a mobile computing device, a smartphone, a tablet computing device, a home gateway, or the like. Although multiple households 120 are depicted in FIG. 1, only one is labeled to simplify the figure. The audience 115 may be divided into segments 125a-125n based on various segmentation factors. Non-limiting examples of segmentation factors include age, gender, occupation, years of home ownership, household size, income, geographic location, family size, media consumption habits, and combinations thereof. For example, an audience segment may include males between the ages of 25 to 35 with an annual income above $50,000.

According to some embodiments, the audience may be household addressable such that the media content provider 105 and/or the local content systems 110a-110n may direct particular content directly to each household 120 and/or segments 125a-125n of the audience 115. According to some embodiments, content may generally include any type of data capable of being received and consumed by a recipient. Illustrative and non-restrictive examples of content include advertising, entertainment programs, informational programs, messages, video, audio, graphical, and/or animated content. The media network 105 may direct particular media content, such as an advertisement or a television program, only to certain segments 125a-125n.

In an embodiment, the media content provider 105 and/or the local content systems 110a-110n may be configured to implement linear addressable systems, such as a linear addressable television advertising system. In a linear addressable system, content may be targeted to individual household 120 receiver devices, such as STBs, home gateways, and/or DVRs in a linear broadcast system. In general, a linear broadcast system may be configured to broadcast all or substantially all content (for example, programming networks) to all receiver devices within the audience 115. Providing targeted content or targeted content elements, such as advertisements, within a linear broadcast system may require that receiver devices are able to access the targeted content during the time that the targeted content is scheduled to be shown, which may generally be referred to as an "avail."

The receiver devices may access the targeted content from various sources. In one example, the targeted content may be broadcast simultaneously with the avail through the media network 100 using a separate transmission stream. In such an example, the receiver devices may switch to the transmission stream carrying the targeted content during the avail and then back to the original transmission stream (for example, a programming transport stream) to return to the original content (for example, a television program) being accessed through the media device. According to some embodiments, the targeted content may be saved, cached, recorded, or otherwise stored on a storage device or disk accessible by the media device. In such embodiments, the media device may access the targeted content stored on the storage device during the avail and then switches back to the original content after the avail has ended.

Figure 2:
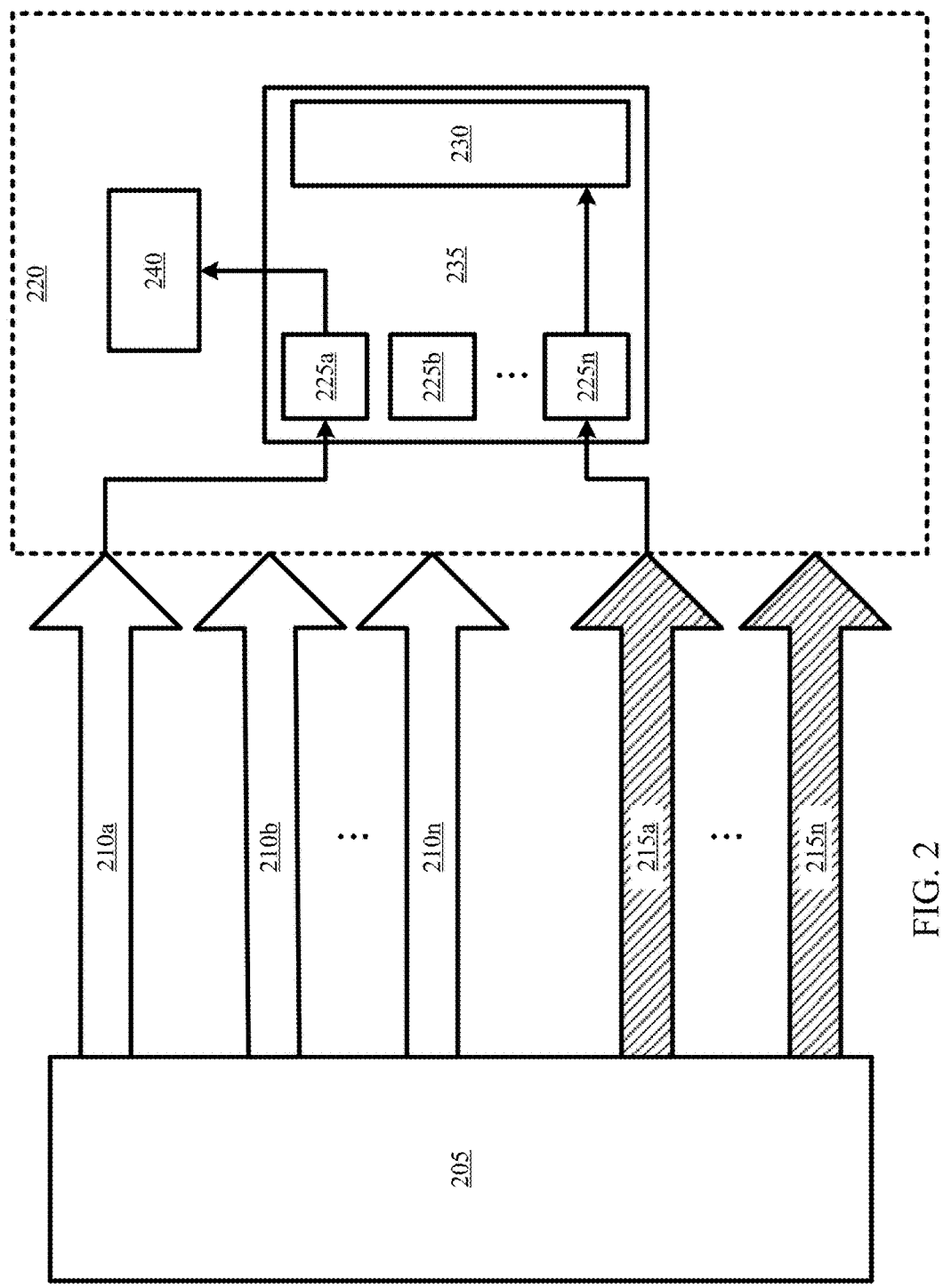
FIG. 2 depicts an illustrative receiver device configured according to an embodiment.

FIG. 2 depicts an illustrative receiver device configured according to an embodiment. As shown in FIG. 2, a household 215 may receive multiple transport streams 210a-210n, 215a-215n from a media network 205. The household 215 may include a receiver device 235, such as a STB, DVR, a home gateway, a television (for instance, a "Smart TV," a "Connected TV," a "Hybrid TV,"), a computing device, or any combination thereof. In an embodiment, the transport streams may include programming transport streams 210a-210n and commercial feed transport streams 215a-215n. The programming transport streams 210a-210n may be configured to transmit programming (for example, television programs) and avail slots to the receiver device 235 as well as information associated with the avails, including time information, information associated with the content scheduled to fill the avail, or the like. The commercial feed transport streams 215a-215n may be configured to transmit content, such as advertising content, that may be configured to be accessed during an avail.

The receiver device 235 may include multiple tuners 225a-225n configured to tune the receiver device 235 to a transport stream 210a-210n, 215a-215n. In an embodiment, the receiver device 235 may be capable of simultaneously handling multiple transport streams 210a-210n, 215a-215n using the multiple tuners 225a-225n. For example, tuner 225a may be tuned to programming transport stream 210a that is being sent through the receiver device 235 to a display device 240 operably coupled to the receiver device for viewing by a user. Tuner 225n may be tuned to commercial feed transport stream 210a, which may be sending the content from the commercial feed transport stream 215a to a storage device 230, such as a DVR or hard disk drive, associated with the receiver device 235.

A media network 205 may include multiple receiver devices 235 associated with a storage device 230 as well as receiver devices that are not associated with a storage device (that is, they do not have the ability to store or cache content) that may receive targeted content. As such, the media network 205 may transmit commercial feed transport streams 215a-215n that are time synchronized with avails within the programming transport streams 210a-210n.

Receiving devices 235 associated with a storage device 230 may save, cache, record, or otherwise store targeted content according to various methods. In a first example according to existing technology, the targeted content may be broadcast at one or more predetermined times (for example, during low activity periods such as late night/early morning) over a commercial feed transport stream 215a-215n. Receiver devices 235 associated with a storage device 230 may be programmed to tune to one or more of the commercial feed transport streams 210a-210n to access and store the targeted content in the storage device. In a second example using existing technology, the targeted content may be individually transmitted to the receiver devices 235 associated with a storage device 230 for storage therein. The transmission of the targeted content in such an example may require a separate connection, such as a unicast connection. An illustrative connection may include an Internet protocol (IP) connection, for example, over DOCSIS 3.

Methods for providing targeted content for storage on a storage device 230 require additional bandwidth, for example, because they use bandwidth beyond that already allocated by the media network 205 for existing transport streams 210a-210n, 215a-215n. For instance, in the first example, broadcast bandwidth is required at predetermined times to transmit the targeted content and in the second example, unicast bandwidth is required. The use of additional bandwidth introduces inefficiencies and costs into the media network 205 that diminish the benefits of providing household addressable targeted content, especially targeted advertising. Accordingly, embodiments provide methods, systems, and computer-readable media configured to, among other things, implement targeted content within a media network 205 that does not require additional bandwidth for the targeted content. For example, some embodiments may use the unused bandwidth in existing transport streams 210a-210n, 215a-215n to transmit targeted content to receiver devices 235. In an embodiment, the unused bandwidth in commercial feed transport streams 215a-215n may be used to transmit targeted content to receiver devices 235. As described in more detail below, some embodiments may use various messaging methods to communicate, schedule, or otherwise initiate the loading and storage of targeted content by receiver devices 235 associated with a storage device 230.

Figure 3:
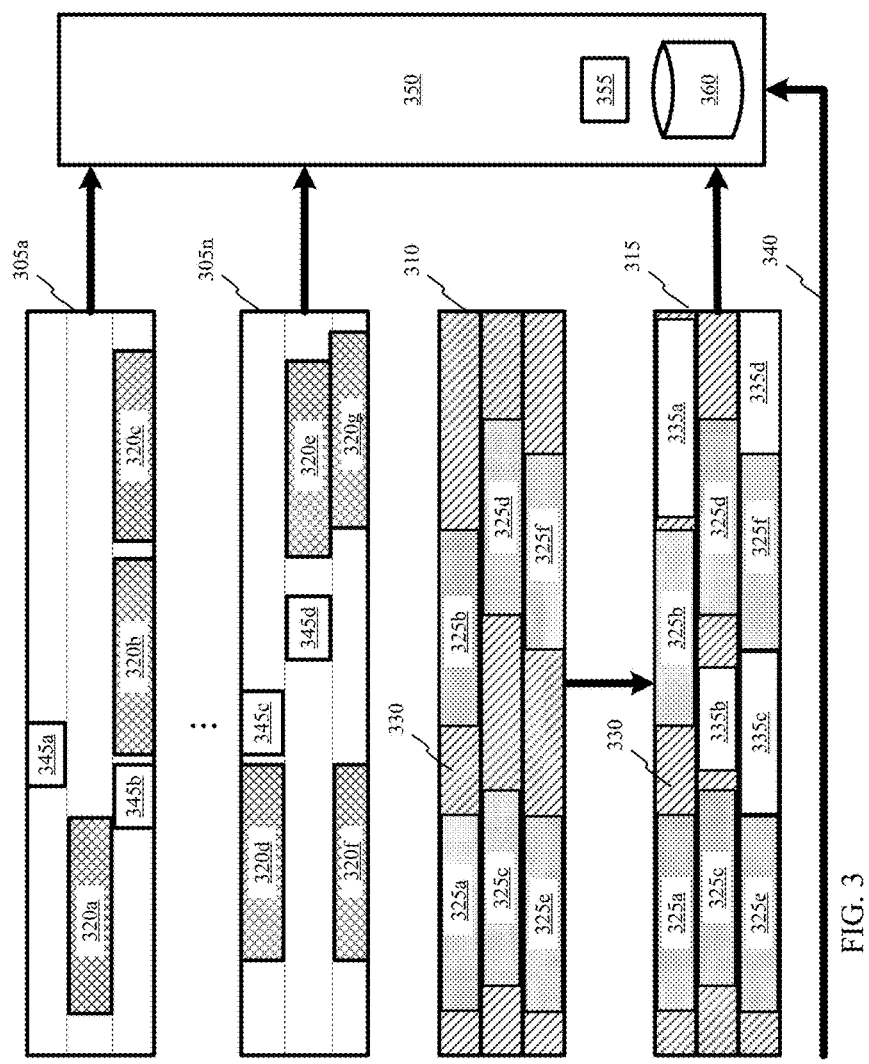
FIG. 3 depicts an illustrative system for providing targeted content to a receiver device.

FIG. 3 depicts an illustrative system for providing targeted content to a receiver device. As shown in FIG. 3, multiple transport streams 305a-305n, 310 may be broadcast, transmitted, or otherwise communicated to a receiver device 350. The transport streams 305a-305n, 310 may be transmitted through a media network, such as media network 100 of FIG. 1 or media network 205 of FIG. 2. The receiver device 350 may include and/or be associated with a storage device 360, such as a DVR or hard disk drive. The storage device 360 may be internal to the receiver device 350 or may be accessible through protocols known to those having ordinary skill in the art, such as Ethernet, Wi-Fi, universal serial bus (USB), serial, high-definition multimedia interface (HDMI), or the like.

The transport streams may include multiple programming transport streams 305a-305n configured to provide programming to the receiver device 350. For example, the programming transport streams 305a-305n may include television programs for a receiver device 350 that is configured as or is configured to provide content to a television. The programming transport streams 305a-305n may also include avails 320a-320g configured for targeted content, such as household addressable advertisements.

At least one commercial feed transport stream 310 may be transmitted to the receiver device 350. The commercial feed transport stream 310 may include commercial feed content 325a-325f, such as advertisements, that may be presented, for instance, during an avail 320a-320g. The commercial feed transport stream 310 may include unused bandwidth 330 that does not include any content, such as the commercial feed content 325a-325f. According to existing technology, the unused bandwidth 330 goes unutilized within the media network. According to some embodiments, the commercial feed transport stream 310 may be analyzed by computing devices, media network equipment, software, combinations thereof, or the like in order to determine where and how much unused bandwidth 330 may be present in a commercial feed transport stream 310.

Some embodiments provided herein may be configured to insert targeted content 335a-335d within the unused bandwidth 330 of the commercial feed transport stream 310 to generate a targeted content transport stream 315. Illustrative and non-restrictive examples of targeted content 335a-335d include advertising, entertainment programs, informational programs, messages, video, audio, graphical, and/or animated content. In an embodiment, the targeted content 335a-335d includes advertisements, such as household addressable television advertisements. In this manner, some embodiments may transmit targeted content 335a-335d to receiver devices 350 without requiring additional bandwidth, transmission equipment, network resources, or the like.

In an embodiment, all or substantially all of the unused bandwidth 330 may be filled with targeted content 335a-335d, for instance, by providing additional targeted content 335a-335d and/or by repeating previously broadcast targeted content, providing receiver devices 350 with targeted content that may have been missed earlier storage opportunities. According to some embodiments, the unused bandwidth 330 may be analyzed by computing devices, media network equipment, software, combinations thereof, or the like in order to determine the locations and capacity of the unused bandwidth in order to properly populate the unused bandwidth with targeted content 335a-335d.

According to some embodiments, the digital receiver 350 may include a processor configured to execute a receiver management application ("receiver application") stored on a computer-readable medium accessible by the processor for controlling certain operations of the digital receiver. The receiver application may be configured to tune the digital receiver to a particular transport stream 305a-305n, 310, 315 and to access information transmitted through the transport streams, for example, in response to a signal, schedule, or the like.

In an embodiment, programs in the programming transport streams 305a-305n may be configured to include content storage signals 345a-345d configured to instruct the receiver application that targeted content 335a-335d is being broadcast on the commercial feed transport stream 315 for storage in the storage device 360. The content storage signals 345a-345d may include various types of information, including, without limitation, transport stream identifiers (which commercial feed transport stream 315 includes the targeted content 335a-335d), targeted content identifiers (which targeted content should be stored), targeted content start times, duration, information for handling the targeted content by the receiver device, or the like. The receiver application may use the information in the content storage signals 345a-345d to tune the receiver device 350 to a particular commercial feed transport stream 315 to access and store particular targeted content 335a-335d. In an embodiment where the receiver device 350 includes multiple tuners, the receiver application may be configured to tune an unused tuner (if available) to the particular commercial feed transport stream 315. In this manner, a user may continue to watch a television program through the receiver device 350 while the receiver device is tuned to a particular commercial feed transport stream 315 to access and store targeted content 335a-335d. In an embodiment, if a tuner is not available, the receiver application may be configured to not tune the receiver device 350 to the commercial feed transport stream 315 and pass on the recording opportunity.

In an embodiment, an out-of-band channel 340 may be used to communicate information to the receiver device 350 for accessing and storing targeted content 335a-335d. Non-limiting examples of out-of-band channels 340 include IP communication channels, radio frequency (RF) communication channels, or the like. For instance, an STB receiver device 350 may include an IP communication channel for receiving information for accessing and storing targeted content 335a-335d.

In an embodiment, the receiver application may access a targeted content schedule 355 configured to instruct the receiver application to tune the receiver device 350 to a particular commercial feed transport stream 315 to access and store particular targeted content 335a-335d according to a predefined schedule. According to some embodiments, the predefined schedule may be loaded in the receiver device 350 at start-up, may be loaded in the receiver device 350 after startup through a broadcast carousel, may be loaded in the receiver through the out-of-band channel 340, may be a part of the firmware of the receiver device, or combinations thereof.

In an embodiment, information, such as metadata, associated with the targeted content 335a-335d may be included in the targeted content signals 345a-345d, 340, 355 and in the commercial feed transport stream 315. For example, the targeted content signals 345a-345d, 340, 355 may include targeted content information associated with a time and location within the commercial feed transport stream 315 to be accessed by the receiver device 350. At the defined time and location, the commercial feed transport stream 315 may include additional targeted content information, such as the transport stream identifiers, targeted content identifiers, targeted content start times, duration, or the like for the receiver device 350. In another embodiment, the additional information in the commercial feed transport stream 315 may include metadata configured to map commercial and location identifiers from the targeted content signals 345a-345d, 340, 355 to actual commercial and location identifiers within the commercial feed transport stream.

Although the commercial feed transport stream 315 has been used as the carrier of targeted content 335a-335d herein, embodiments are not so limited, as any transport stream capable of operating according to some embodiments is contemplated herein.

The receiver application and/or media network applications may be configured to provide exception handling, for instance, if the storage of targeted content 335a-335d is interrupted. In a television network example, targeted commercials may be triggered by a cue tone message, or other suitable trigger, broadcast by the television network which may be triggered at nearly any point in time (for instance, asynchronously). The cue tone on a programming transport stream 305a-305n may trigger a targeted avail cue tone when the media network is also broadcasting targeted content 335a-335d through the commercial feed transport stream 315, for example, because unused bandwidth was detected. The availability of the targeted content 335a-335d may be communicated to the receiver device 350 through a targeted content signal 345a-345d, 340, 355 and the receiver device may be storing the targeted content during the cue tone. As such, the downloading of the targeted content 335a-335d may need to be cancelled and the receiver devices 350 within the media network that were recording the targeted content may be informed to cancel the storage process. According to some embodiments, a "cancel message" (not shown) may be inserted within the commercial feed transport stream 315 responsive to a storage/avail conflict to notify the receiver devices 350 that the storage of targeted content 335a-335d must be cancelled, after which the next targeted avail may be executed.

Figure 4:
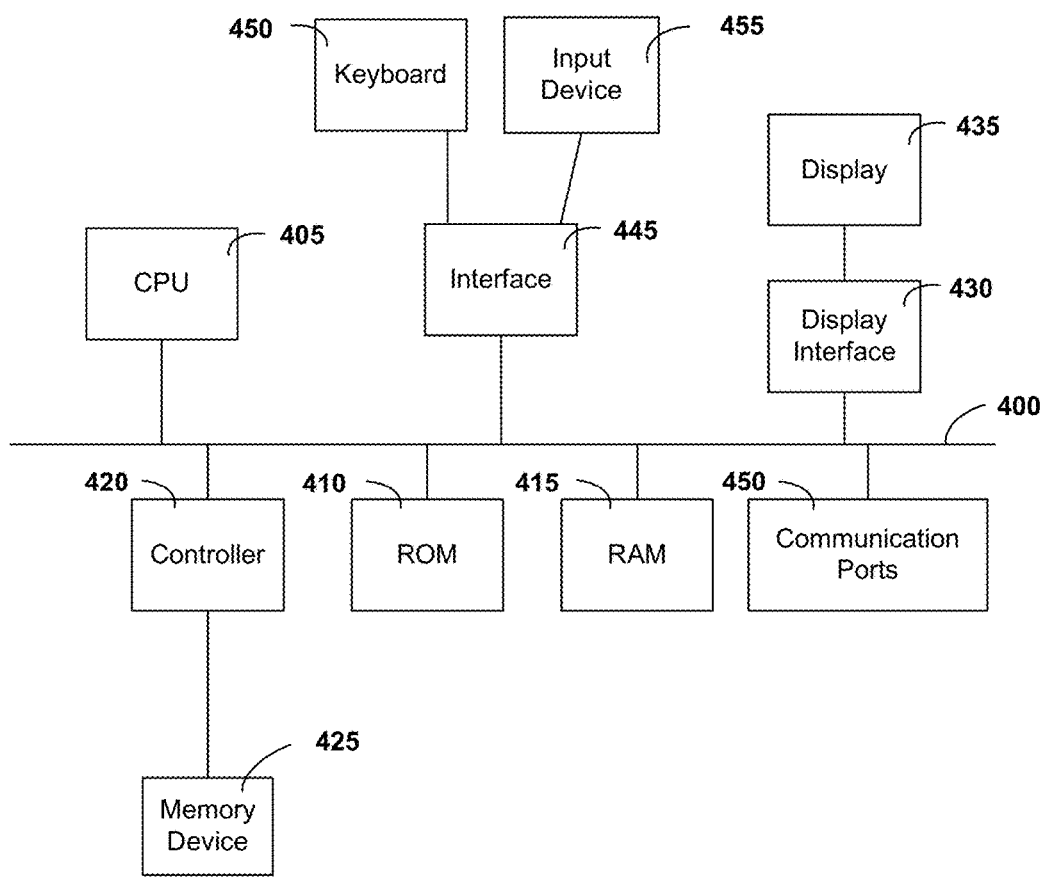
FIG. 4 depicts a block diagram of exemplary internal hardware that may be used to contain or implement the various computer processes and systems as discussed above.

FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 430 and random access memory (RAM) 435 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with, among other things, analyzing a transport stream, inserting targeted content into a transport stream, and storing targeted data as described above may be stored in the ROM 430 and/or the RAM 435. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 430 may permit information from the bus 400 to be displayed on the display 435 in audio, visual, graphic or alphanumeric format. The information may include information related to a current job ticket and associated tasks. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A system for storing at least one targeted content element on a receiver device within a household-addressable media network, the system comprising:
    a processor; and
    a non-transitory, computer-readable storage medium in operable communication with the processor, wherein the computer-readable storage medium contains one or more programming instructions that, when executed, cause the processor to:
        determine a capacity and at least one location of unused bandwidth in at least one commercial feed transport stream being transmitted to a plurality of tuners in a receiver device, the plurality of tuners configured to tune the receiver device to receive the at least one commercial feed transport stream, wherein the commercial feed transport stream comprises one or more non-targeted content elements;
        insert the at least one targeted content element into the unused bandwidth of the at least one commercial feed transport stream, and
        insert at least one content storage signal into at least one of a plurality of programming transport streams being transmitted to the receiver device, the at least one content storage signal being configured to instruct the receiver device to store the at least one targeted content element.

2. The system of claim 1, wherein the receiver device comprises at least one of a set-top-box, a television, a computing device, or combinations thereof.

3. The system of claim 1, wherein the at least one targeted content element comprises a targeted advertisement.

4. The system of claim 1, wherein the at least one content storage signal is inserted into an out-of-band channel.

5. The system of claim 1, further comprising transmitting a targeted content schedule to the receiver device for scheduling storage of the at least one targeted content element by the receiver device.

6. The system of claim 1, wherein the at least one content storage signal comprises: at least one transport stream identifier,
    at least one targeted content identifier, and
    at least one of a targeted content start time, a targeted content duration, and targeted content handling information.

7. The system of claim 1, wherein the at least one content storage signal comprises targeted content information associated with a time and location within the at least one commercial feed transport stream to be accessed by the receiver device.

8. A computer-implemented method for storing at least one targeted content element on a receiver device within a household-addressable media network, the method comprising, by a processor:
    determining a capacity and at least one location of unused bandwidth in at least one commercial feed transport stream being transmitted to a plurality of tuners in a receiver device, the plurality of tuners configured to tune the receiver device to receive the at least one commercial feed transport stream, wherein the commercial feed transport stream comprises one or more non-targeted content elements;
    inserting the at least one targeted content element into the unused bandwidth of the at least one commercial feed transport stream; and
    inserting at least one content storage signal into at least one of a plurality of programming transport streams being transmitted to the receiver device, the at least one content storage signal being configured to instruct the receiver device to store the at least one targeted content element.

9. The method of claim 8, wherein the receiver device comprises at least one of a set-top-box, a television, a computing device, or combinations thereof.

10. The method of claim 8, wherein the media network is configured as a cable television system.

11. The method of claim 8, wherein the at least one targeted content element comprises a targeted advertisement.

12. The method of claim 8, wherein the at least one content storage signal is inserted into an out-of-band channel.

13. The method of claim 8, further comprising transmitting a targeted content schedule to the receiver device for scheduling storage of the at least one targeted content element by the receiver device.

14. The method of claim 8, wherein the at least one content storage signal comprises: at least one transport stream identifier,
    at least one targeted content identifier, and
    at least one of a targeted content start time, a targeted content duration, and targeted content handling information.

15. A receiver device for storing at least one targeted content element broadcast through at least one transport stream within a household-addressable media network, the device comprising:
    a plurality of tuners configured to tune the receiver device to receive the at least one transport stream;
    a processor;
    at least one storage device in operable communication with the processor; and
    a non-transitory, computer-readable storage medium in operable communication with the processor, wherein the computer-readable storage medium contains one or more programming instructions that, when executed, cause the processor to:
    receive at least one commercial feed transport stream and at least one of a plurality of programming transport streams, wherein the commercial feed transport stream comprises one or more non-targeted content elements,
    receive at least one content storage signal via the at least one programming transport stream, the at least one content storage signal comprising targeted content information configured to instruct the receiver device to store the at least one targeted content element being broadcast in unused bandwidth of the at least one commercial feed transport stream, tune at least one of the plurality of tuners to the at least one commercial feed transport stream responsive to receiving the content storage signal while another of the plurality of tuners is tuned to the at least one of a plurality of programming transport steams, and store at least one of the at least one targeted content element in the at least one storage device based on the targeted content information.

16. The device of claim 15, wherein the at least one storage device comprises at least one of a digital video recorder and a hard disk drive.

17. The device of claim 15, wherein the device comprises is at least one of a set-top-box, a television, a computing device, or combinations thereof.

18. The device of claim 15, wherein the media network is configured as a cable television system.

19. The device of claim 15, wherein the at least one targeted content element comprises a targeted advertisement.

20. The device of claim 15, wherein the content storage signal is provided through an out-of-band channel.

21. The device of claim 15, wherein the content storage signal is provided through a targeted content schedule.

22. A computer-readable storage medium having computer-readable program code configured to store at least one targeted content element on a receiver device within a household-addressable media network, the computer-readable program code comprising:

computer-readable program code configured to determine a capacity and at least one location of unused bandwidth in at least one commercial feed transport stream being transmitted to a plurality of tuners in a receiver device, the plurality of tuners configured to tune the receiver device to receive the at least one commercial feed transport stream, wherein the commercial feed transport stream comprises one or more non-targeted content elements;

computer-readable program code configured to insert the at least one targeted content element into the unused bandwidth of the at least one commercial feed transport stream; and computer-readable program code configured to insert at least one content storage signal into at least one of a plurality of programming transport streams being transmitted to the receiver device, the at least one content storage signal being configured to instruct the receiver device to store the at least one targeted content element.

23. The computer-readable storage medium of claim 22, wherein the receiver device comprises at least one of a set-top-box, a television, a computing device, or combinations thereof.

24. The computer-readable storage medium of claim 22, wherein the at least one targeted content element comprises a targeted advertisement.

25. The computer-readable storage medium of claim 22, wherein the at least one content storage signal is provided through an out-of-band channel.

26. The computer-readable storage medium of claim 22, further comprising computer readable program code configured to transmit a targeted content schedule to the receiver device for scheduling storage of the at least one targeted content element by the receiver device.

* * * * *